United States Patent [19]
Wolf et al.

[11] Patent Number: 4,864,096
[45] Date of Patent: Sep. 5, 1989

[54] TRANSFER ARC TORCH AND REACTOR VESSEL

[75] Inventors: Charles B. Wolf, Irwin; William J. Melilli, Belle Vernon, both of Pa.

[73] Assignee: Westinghouse Electric Corp., Pittsburgh, Pa.

[21] Appl. No.: 134,722

[22] Filed: Dec. 18, 1987

[51] Int. Cl.$^4$ .............................................. B23K 9/00
[52] U.S. Cl. ........................ 219/121.36; 219/121.52; 219/123; 219/121.48; 373/20; 373/64; 373/22; 75/10.2
[58] Field of Search .............. 219/121 P, 121 PY, 75, 219/121 PR, 123, 121 PM, 121 PL, 76.16; 313/231.31, 231.41, 231.51; 75/10.19, 11, 10.34, 10.2; 373/18, 20, 22, 64, 147

[56] References Cited

U.S. PATENT DOCUMENTS

| | | | |
|---|---|---|---|
| 3,102,946 | 9/1963 | Fonberg | 219/123 |
| 3,705,975 | 12/1972 | Wolf et al. | 219/383 |
| 3,832,513 | 8/1974 | Klasson | 219/75 |
| 3,928,745 | 12/1975 | Demars et al. | 219/121 P |
| 3,940,641 | 2/1976 | Dooley | 219/123 |
| 3,949,188 | 4/1976 | Tatono | 219/121 PP |
| 3,953,705 | 4/1976 | Painter | 219/121 P |
| 3,997,333 | 12/1976 | Fey | 75/11 |
| 4,071,588 | 1/1978 | Fey et al. | 264/15 |
| 4,089,628 | 5/1978 | Blackburn | 431/6 |
| 4,125,754 | 11/1978 | Wasserman et al. | 219/121 P |
| 4,140,892 | 2/1979 | Müller | 219/121 P |
| 4,144,444 | 3/1979 | Dementiev et al. | 219/383 |
| 4,194,106 | 3/1980 | Rudaz et al. | 219/123 |
| 4,214,736 | 7/1980 | Wolf et al. | 266/200 |
| 4,247,732 | 1/1981 | Fey | 266/197 |
| 4,250,373 | 2/1981 | Tanida | 219/75 |
| 4,266,113 | 5/1981 | Denton et al. | 219/121 PQ |
| 4,549,065 | 10/1985 | Camacho et al. | 219/121 PM |
| 4,555,612 | 11/1985 | Collins et al. | 219/121 PY |
| 4,559,439 | 12/1985 | Camacho et al. | 219/121 PM |
| 4,570,048 | 2/1986 | Poole | 219/121 PP |
| 4,571,259 | 2/1986 | Fey et al. | 75/10 R |
| 4,668,853 | 5/1987 | Fey et al. | 219/121 PM |

OTHER PUBLICATIONS

B. K. Paley, R. Christopher, J. M. Penza Plasma Arc Pulverized Coal Ignition Demonstration Test. 1984.

Primary Examiner—M. H. Paschall
Attorney, Agent, or Firm—G. H. Telfer

[57] ABSTRACT

A transferred arc torch is comprised of a first electrode surrounded by a coil. A second electrode is positioned adjacent to the first electrode so as to provide a small gap therebetween for striking an arc. The second electrode is configured to enable the arc to be transferred therefrom. The transferred arc torch may be used in conjunction with a vessel to provide a unique plasma reactor.

12 Claims, 2 Drawing Sheets

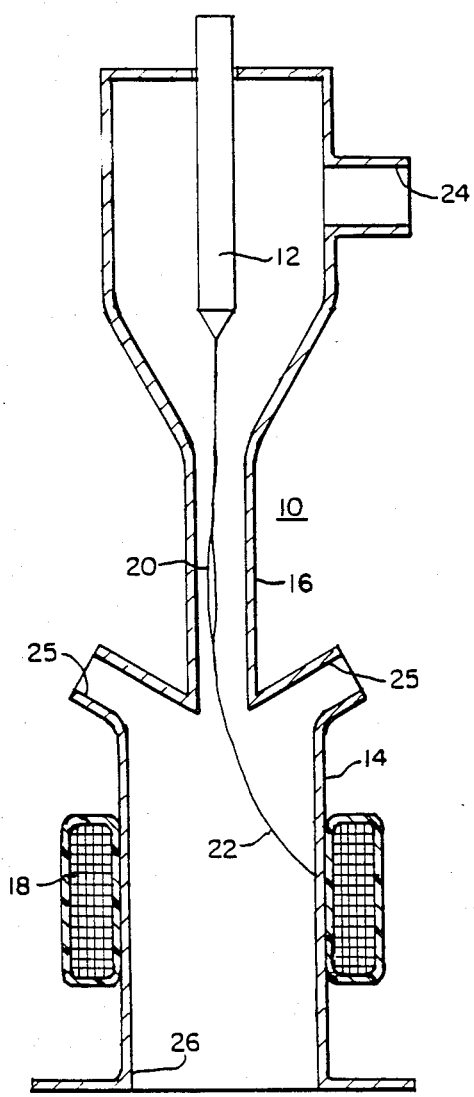
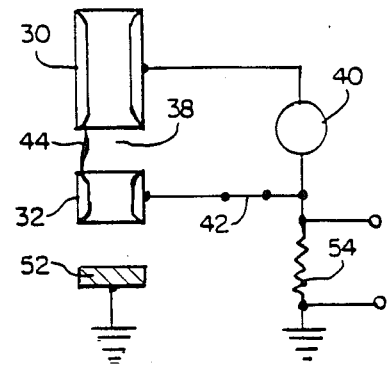
PRIOR ART
FIG. 1.
FIG. 3.

TRANSFER ARC TORCH AND REACTOR VESSEL

BACKGROUND OF THE INVENTION

2. Field of the Invention

The present invention is directed generally to arc torches and more particularly to arc torches of the transfer type.

2. Description of the Prior Art

Plasma arc torches are well known in the art as seen, for example, by U.S. Pat. No. 4,144,444 to Dementiev et al., issued Mar. 13, 1979. FIG. 1 illustrates how the arc torch of the aforementioned patent functions. In FIG. 1, a torch 10 includes a rod-type electrode 12, a hollow, cylindrical electrode 14 and a diaphragm 16. The electrode 14 is larger in diameter than the diaphragm 16. A solenoid 18 is disposed about the electrode 14. An arc is initially struck across the gap between the electrode 12 and the diaphragm 16. An inlet 24 serves to inject a carrier gas which causes the foot of the arc, which is attached to the diaphragm, to move downwardly along the diaphragm until it transfers to the electrode 14. Thus, the arc is made up of a longitudinally-blown portion 20 disposed in the diaphragm 16 and a cross-blown portion 22 disposed in the electrode 14. The cross-blown arc portion 22 is caused to rotate in a magnetic field generated by the solenoid 18. Inlets 25 allow a feedstock gas to be injected into the cylindrical electrode 14 where it is heated by the rotating portion of the cross-blown arc 22. An outlet 26 serves to discharge the heated gas.

Because of the ability of an arc torch to heat a gas, fluid or other matter to extremely high temperatures, arc torches have found uses in a wide variety of applications. Arc heaters have been used for melting metal chips as disclosed in U.S. Pat. No. 4,214,736 to Wolf et al., for processing magnetite spheres as disclosed in U.S. Pat. No. 4,071,588 to Fey et al., and for reducing complex metallic ores as disclosed in U.S. Pat. No. 3,997,333 to Fey. Arc torches have also been used for firing an iron blast furnace as disclosed in U.S. Pat. No. 4,247,732 to Fey and for igniting pulverized coal as the coal is fed in an air stream through the coal burners of a conventional coal fired steam boiler as disclosed in U.S. Pat. No. 4,089,628 to Blackburn.

Plasma arc torches have also been put to such varied uses as welding, as disclosed in U.S. Pat. Nos. 3,949,188 to Tateno, 4,250,373 to Tanida, and 3,928,745 to Demars et al., surfacing processes as disclosed in U.S. Pat. Nos. 4,140,892 to Muller and 4,125,754 to Wasserman et al., and cleaning as disclosed in U.S. Pat. No. 4,555,612 to Collins, et al.

Despite the wide variety of applications for plasma torches, such torches may be classified into two general types: transferred and non-transferred torches. In the non-transferred torch, the arc is completely contained within the torch and extends from an upstream electrode to a downstream electrode. In applications where it is desirable to produce a stream of super-heated gas, the non-transferred type of torch is often used. For example, see aforementioned U.S. Pat. No. 4,214,736 used in an arc heater melting system, U.S. Pat. No. 3,997,33 used in a process for the reduction of complex metallic ores, U.S. Pat. No. 4,247,732 used in a method for electrically firing an iron blast furnace, and U.S. Pat. No. 4,089,628 used for igniting a stream of pulverized coal.

In the transferred type of arc torch, the foot of the arc leaves one of the electrodes to attach to another surface, typically the workpiece. In this regard, arc torches used for welding such as U.S. Pat. Nos. 3,949,188 and 3,928,745 and arc torches used for surfacing such as U.S. Pat. No. 4,125,754 are examples of transfer type arc torches.

In addition to classifying torches on the basis of being a transfer or a non-transfer type of torch, torches may be classified according to the configuration of the electrodes. In one configuration, two cylindrical electrodes are provided which are oriented colinearly. In this orientation, a small gap is provided between adjacent ends of the cylindrical electrodes in which the arc is struck. Thereafter, a carrier gas is used to blow the arc out of this gap. In this regard, see U.S. Pat. No. 4,559,439.

In a second configuration, one of the electrodes is shaped like a rod and is positioned within a second electrode which is cylindrically shaped. The arc is struck in the gap between the rod shaped electrode and cylindrically shaped electrode. A carrier gas is used to blow the arc to the tip of the rod shaped electrode at which time the foot of the arc may be transferred from the cylindrical electrode to a workpiece. In this regard, see U.S. Pat. No. 3,928,745.

Although arc torches have been used in a wide variety of applications, the need exists for a torch configuration which provides for extended electrode life. There is also a need for an arc torch designed so that the electrodes may be easily replaced when they do become worn or eroded. It is also desirable to design an arc torch which is easy and inexpensive to manufacture. Overriding all of these considerations is the need to have an arc torch which produces an arc which is stable and controllable, and a design which is easily adaptable for high current and high power applications.

SUMMARY OF THE PRESENT INVENTION

The present invention is directed to a transferred arc torch comprising a first electrode surrounded by a coil. A second electrode is positioned adjacent to the first electrode to provide a small gap therebetween for striking an arc. The second electrode is configured to enable the arc to be transferred therefrom. A source of arc transfer gas is provided to facilitate movement, and transfer, of the arc.

In one embodiment of the present invention, the first and second electrodes take the form of cylindrical electrodes positioned such that the gap is formed between adjacent ends of the electrodes. The second electrode is constructed without a coil and is substantially shorter than the first electrode. This configuration enables the arc to be stable and easily transferred from the shorter electrode. Because the arc spends very little time attached to the shorter electrode, the coil normally associated with this electrode can be eliminated therefrom without causing undo erosion of this electrode. The length of the electrode is chosen such that the arc may be easily transferred while at the same time eliminating the possibility of the arc's curving back and attaching to the body of the torch. The coil surrounding the first electrode causes the arc to rotate thereby extending the life of that electrode. This design has the advantage of being operable on virtually any type of gas: inert; oxydizing or reducing.

According to another embodiment of the present invention, the first electrode includes a rod-shaped electrode and the second electrode includes a cylindrical electrode coaxially positioned around the rod electrode. This embodiment also results in a stable arc which can be easily transferred from the cylindrical electrode. During initial start-up, the field coil rotates the arc thereby enhancing electrode life.

The torch of the present invention, in addition to providing a stable and easily transferred arc, provides for extended electrode life. Because of simple electrode designs, the torch is easy and inexpensive to manufacture.

The transferred type of arc torch of the present invention is ideally suited for use in a plasma reactor wherein the torch is used in conjunction with a vessel having a tubular portion constructed of an electrically conductive material. The torch is positioned with respect to the vessel such that the arc can be transferred to the tubular portion of the vessel. A coil is provided around the tubular portion of the vessel for rotating the arc thereby enhancing vessel life. In this configuration, a very efficient plasma reactor is achieved in which other gases, chips, or other types of feedstock may be rapidly and efficiently heated to high temperatures. These and other advantages and benefits of the present invention will become apparent from the Description Of A Preferred Embodiment hereinbelow.

BRIEF DESCRIPTION OF THE DRAWINGS

In order that the present invention may be clearly understood and readily practiced, preferred embodiments will now be described, by way of example only, with reference to the accompanying figures wherein:

FIG. 1 illustrates a prior art torch;

FIG. 3 is an electrical schematic of the arc torch shown in FIG. 2;

DESCRIPTION OF A PREFERRED EMBODIMENT

Figure 2:
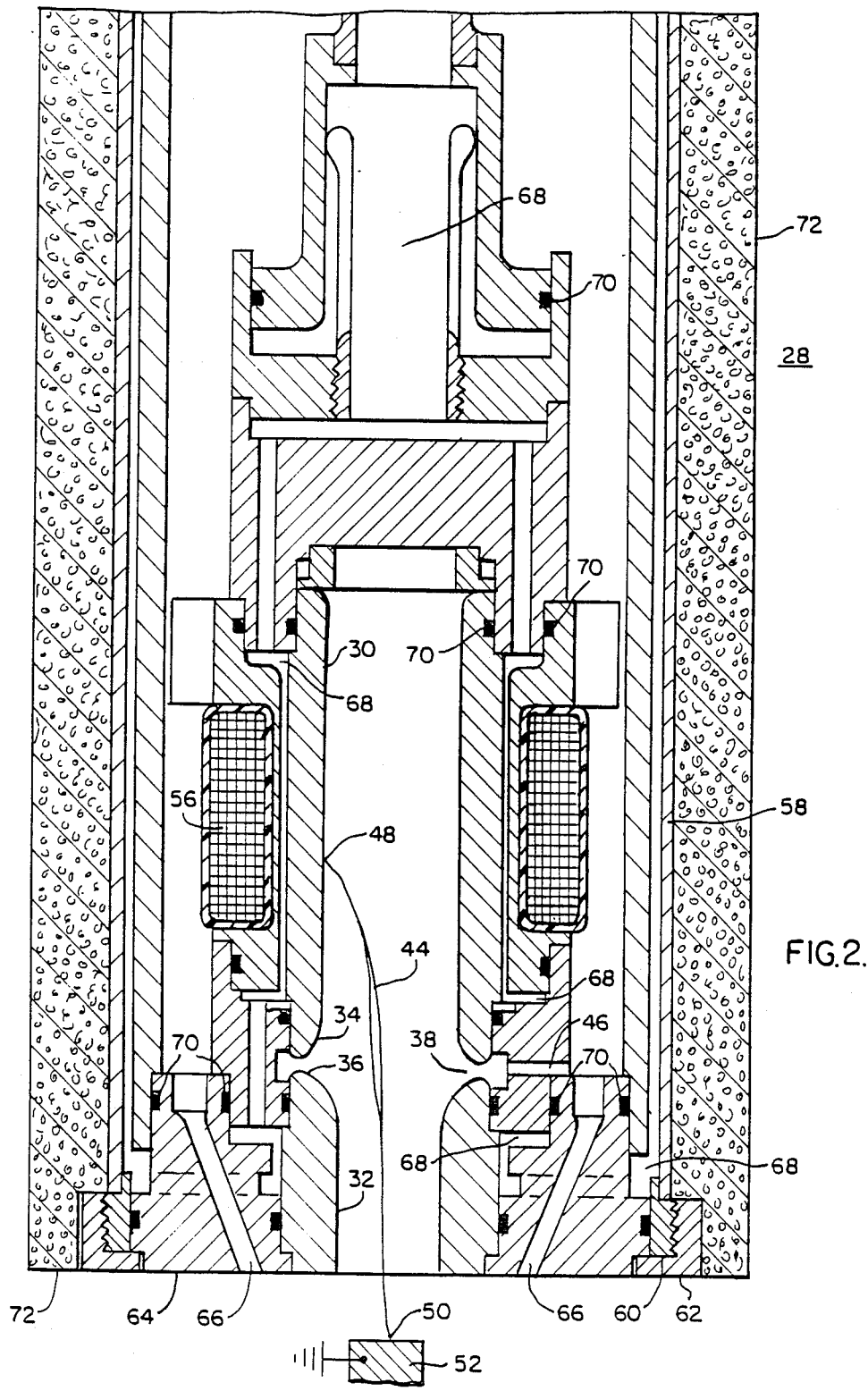
FIG. 2 illustrates a transfer arc torch constructed according to the teachings of the present invention and having a pair of colinear cylindrical electrodes.

Preferred embodiments of the present invention will now be described in conjunction with FIGS. 2-5. Turning first to FIG. 2, a torch 28 constructed according to the teachings of the present invention is illustrated. The torch 28 has a first cylindrical or tubular electrode 30 and a second cylindrical or tubular electrode 32. The cylindrical electrodes 30 and 32 are oriented colinearly along an axis so that a lower end 34 of the electrode 30 is adjacent to an upper end 36 of the electrode 32 to form a gap 38, typically on the order of one millimeter.

As shown in FIG. 3, the electrodes 30 and 32 are connected across a power supply 40 when a switch 42 is closed. The electrode 30, referred to as the upstream electrode, is typically operated at a high voltage while the electrode 32, referred to as the downstream electrode, is normally at ground potential. With the electrodes thus energized, an arc 44 is struck across the gap 38.

An arc transfer gas is forced through a path 46, shown in FIG. 2, in a known manner to blow the arc out of the gap 38. The gas forces a head end 48 of the arc 44 to travel upwardly, as seen in FIG. 2, along the upstream electrode 30 and causes a foot 50 of the arc 44 to travel downwardly along the downstream electrode 32 until the foot leaves, or is transferred from, the electrode 32. At this time the foot 50 of the arc 44 typically attaches to another surface such as a workpiece 52. The workpiece or target 52 may be a metal bath or other conductive material to be heated and thus processed. When the foot 50 of the arc 44 attaches to the workpiece 52, a current sensor (not shown) senses the flow of current through a resistor 54 and causes switch 42, shown in FIG. 3, to be opened thereby removing the downstream electrode 32 from the electrical circuit. Switching of the downstream arc 32 out of the circuit minimizes any external arcing to the torch. The torch is, of course, mounted by means of an insulating material (not shown) so that there is no current path to ground after switch 42 has been opened.

The arc transfer gases which can be blown through path 46 may include air, nitrogen, argon, helium, hydrogen, carbon monoxide, methane (natural gas), other hydrocarbons, or mixtures of the aforementioned. The blowing of the arc out of the gap 38 is not considered to be an important feature of the present invention.

Completing the description of the torch 28 illustrated in FIG. 2, the first electrode 30 is surrounded by an electrical coil 56. The coil 56 may be connected either in series with the arc or be powered by a separate field coil power supply (not shown) in a known manner. For simplicity, the series connection may be preferred. The coil 56, when energized, causes the attachment point of the head 48 of the arc 44 to rotate very rapidly within the cylindrical electrode 30. This rotation prevents the electrode from becoming prematurely eroded or worn out. The field coil may also increase arc voltage.

The components of the torch 28 are maintained within an outer metal cylindrical shell 58. Along its lower circumference, the shell 58 has a threaded ring 60 welded or otherwise attached thereto. The ring 60 carries threads suitable for mating with the threads of an end ring 62 having a L-shaped cross section as seen in FIG. 2. The horizontally extending portion of the end ring 62 may be used to retain an end cap 64 within the shell 58. The end cap 64 provides support for the electrodes 30 and 32, the coil 56, and the other components which make up the torch 28. By unscrewing the end ring 62, the end cap 64 can be removed thereby enabling easy replacement of the electrodes from the tip end without complete disassembly of the torch. The electrodes themselves are simple in design and therefore easy and inexpensive to manufacture.

The end cap 64 is provided with feedstock passages 66 for feeding process materials into the region of the arc. These materials may be particulates, gases, or even liquids depending on the application.

The torch 28 is provided with a plurality of passages 68 through which cooling water flows. The water passages 68 are provided so that the electrode 30 as well as the electrode 32 may be water cooled. Because of the configuration of the electrodes, the water passages 68 are fairly close to the surfaces from which the arc 44 extends. For that reason, and because the electrode 30 is often operated as an anode, the electrode 30 of the torch shown in FIG. 2 is often referred to as a cold anode. Because the electrodes 30 and 32 need not operate at high temperatures, they may be constructed of a material such as copper. A plurality of O-rings 70 are provided so that the materials carried in the various passages will be confined thereto. Finally, a refractory material 72 may be provided which surrounds the shell 58 of the torch 28.

One of the advantages of the torch 28 shown in FIG. 2 is the elimination of the coil normally provided around the downstream electrode 32. This reduces the cost of the overall torch and makes it easier to assemble and maintain. Downstream electrode 32 is substantially shorter than upstream electrode 30, typically having a length on the order of 3.175 cm, (1.25 inches), thereby making it easy for the foot 50 of the arc 44 to transfer therefrom while at the same time insuring that the arc 44 does not arc back and attach to some portion of the torch such as the end cap 64 or end ring 62. The downstream electrode may be shaped more like a nozzle (not shown) to better focus the arc and permit a longer arc.

A small prototype of the torch design shown in FIG. 2 was constructed and operated with air, nitrogen and argon being used as the transfer gas. Arc targets were either graphite or an iron billet. The following table summarizes the data gathered as a result of the experimental operation of the prototype.

TABLE NO. 1

| Arc Volts | 400–1000 volts |
| Arc current | 350–800 amps |
| Arc length | 10.16–40.64 cms (4–18 inches) |
| Gas flow rate | 10–15 SCFM |
| Arc power | 120–630 KW |
| Torch loss | 13.1–37.2 KW |
| Efficiency | 89% or greater |

Figure 4:
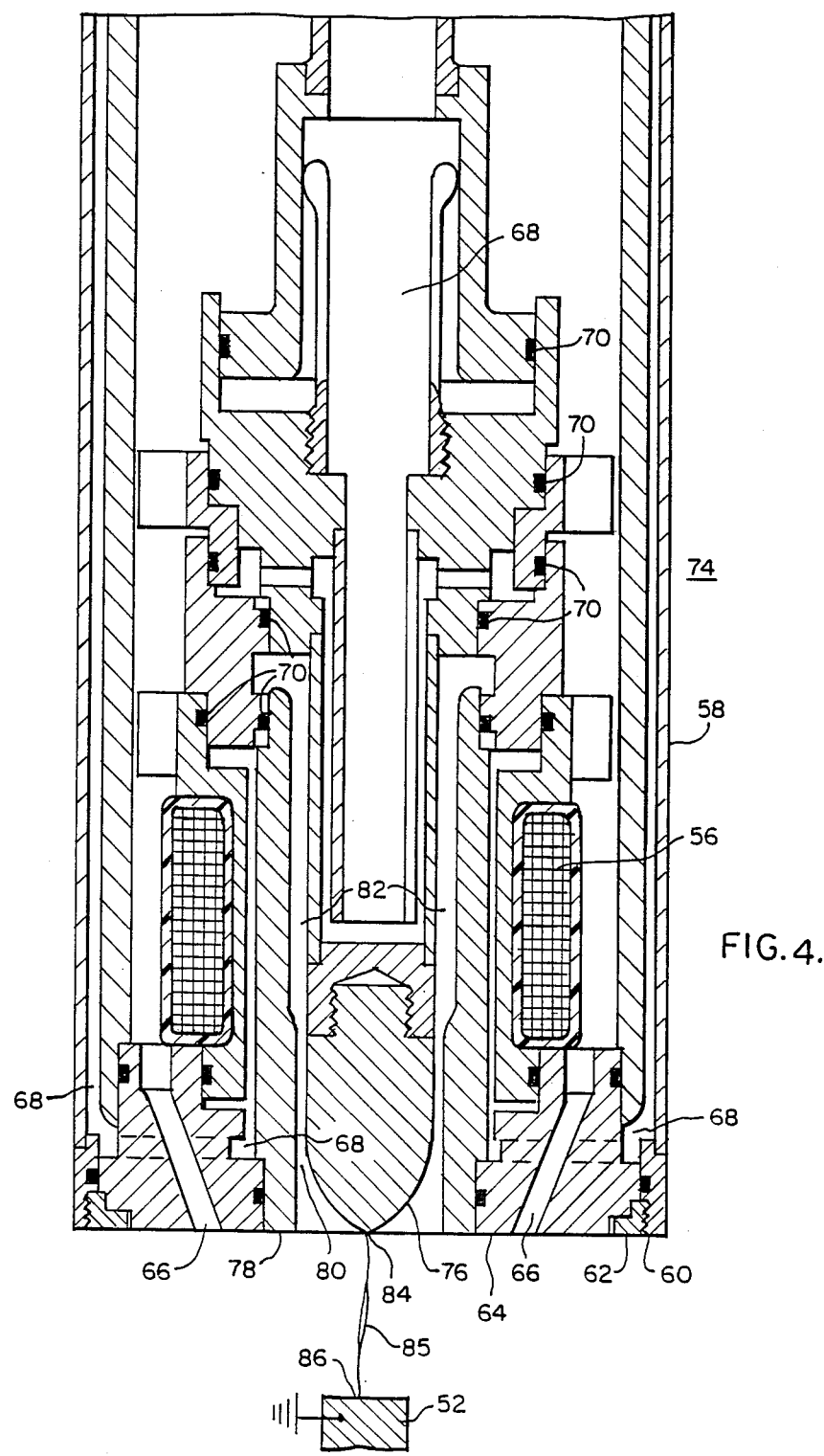
FIG. 4 illustrates a transfer arch torch constructed according to the teachings of the present invention and having a rod-type electrode surrounded by a cylindrical electrode.

FIG. 4 illustrates an alternative embodiment for an arc torch 74 constructed according to the teachings of the present invention. Where appropriate, components having a similar structure and function to those identified in FIG. 2 will be given like reference numerals.

The torch 74 of FIG. 4 has a rod-type electrode 76 positioned axially within a cylindrical electrode 78. A field coil 56 is positioned about the cylindrical electrode 78 so that it also encompasses a portion of the rod electrode 76. The electrical operation of the torch 74 is the same as for the torch 28 which was discussed above in conjunction with FIG. 3. However, the coil 56 in the torch 74 is used for rotating the arc primarily during startup. During startup, an arc is struck in a gap 80 with the head of the arc attached to the electrode 76 and the foot of the arc attached to the electrode 78. A transfer gas is injected through the passage 82 which forces the head 84 of an arc 85 to the tip of the electrode 76 and the foot 86 of the arc 85 downwardly, as shown in FIG. 4, along the electrode 78 until it transfers to the target 52.

Water cooling passages 68 are provided to cool the electrodes 76 and 78. However, because the water cooling passage for the electrode 76 is placed far enough away from the surface from which the arc 85 extends, electrode 76 operates at a temperature in the range of 3,000 F. to 4,000 F., or even higher, at the electrode surface. For this reason, the electrode 76 should be made of tungsten or other suitable material capable of withstanding the high temperatures of operation. For maximum heat transfer to the target 52, the electrode 76 is often operated as a cathode. Under those circumstances, electrode 76 is often referred to as a hot cathode. However, it is possible to operate the electrode 76 as an anode, or even on AC current. For arc stability and control, however, the torch 74 is preferably operated on DC current.

The torch 74 of FIG. 4 has a cylindrical shell 58 having a threaded ring 60 which provide the same functions as discussed in conjunction with FIG. 2. The ring 60 carries threads for mating with the L-shaped end ring 62 which supports the end cap 64. The feedstock passages 66 may be provided for the same purposes as discussed hereinabove in conjunction with FIG. 2.

As with the embodiment shown in FIG. 2, the electrode shape of the embodiment shown in FIG. 4 is relatively simple in design and therefore easy and inexpensive to manufacture. The electrode assembly is easily replaced from the tip without complete disassembly of the torch.

A small prototype of the embodiment illustrated in FIG. 4 was constructed and operated with nitrogen as the transfer gas. Arc targets were either graphite or a iron billet.

TABLE NO. 2

| Arc volts | 200–540 volts |
| Arc current | 400–1200 amps |
| Arc length | 10.16–45.72 cm (4–18 ins.) |
| Gas flow rate | 6–10 SCFM |
| Arc power | 100–630 kw |
| Torch loss | 10–20 Kw |
| Efficiency | 90% or greater |

Figure 5:
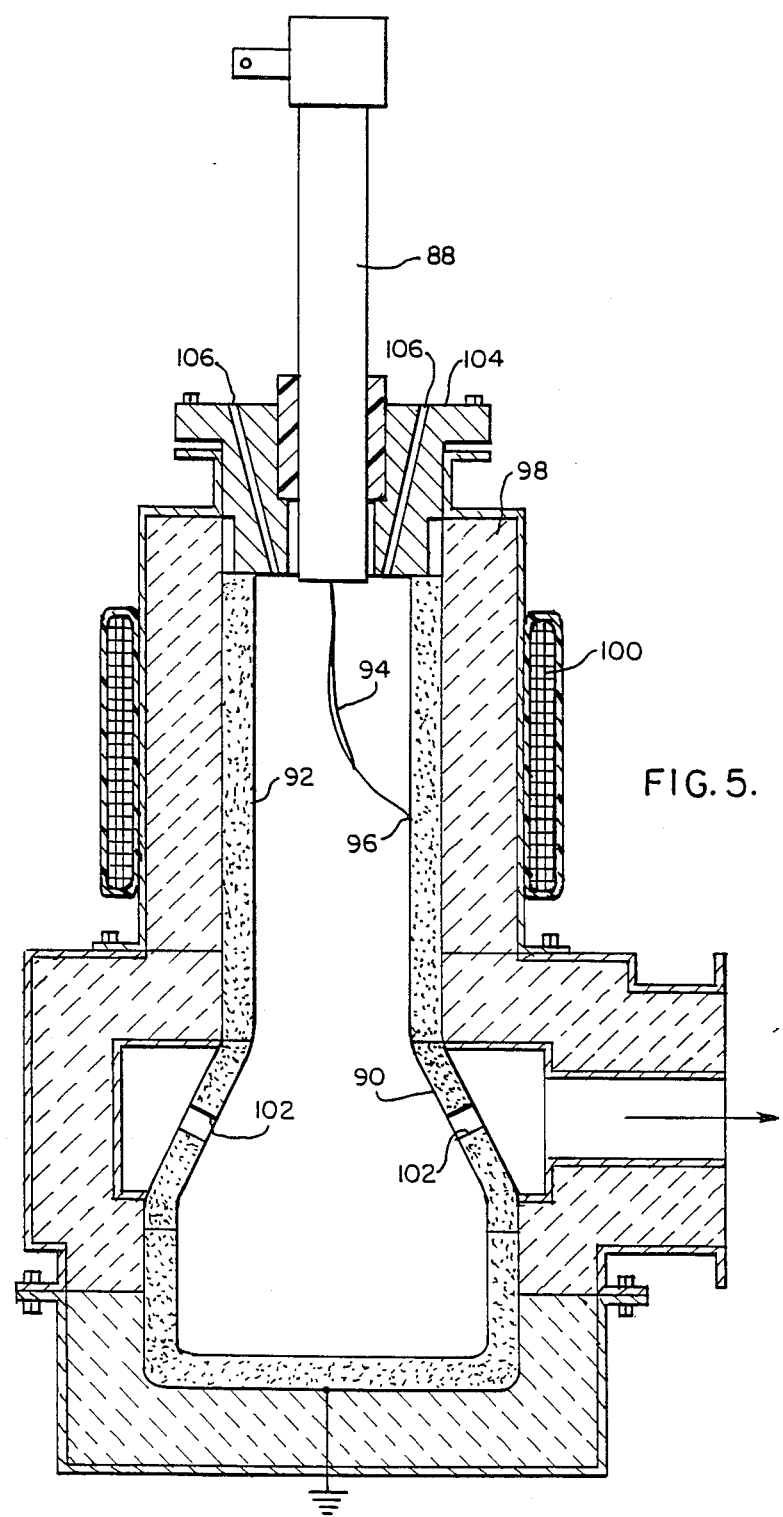
FIG. 5 illustrates a plasma reactor constructed according to the teachings of the present invention.

The present invention contemplates the use of a transfer type of arc torch 88 shown in FIG. 5, used in conjunction with a vessel 90. The combination of the torch 88 and vessel 90 may be referred to as a plasma reactor.

Nearly all high temperature processes are carried out in refractory lined or insulated vessels or furnaces of some sort unless the heating rate is high, residence time is low, the vessel is otherwise protected by water cooling, or heat loss is not a consideration. Sealed vessels are used where effluents are dangerous or dirty or where reactor or furnace atmosphere is important. Heating of the vessel or furnace may be carried out in a number of ways, for example, through the use of fossil fuels. In such a case, a high percentage of the energy is carried out of the vessel in the effluent. A second method of heating is by heating a gas to a high temperature in an electric arc torch and then admitting the gas into the chamber. A third method is the use of a transferred arc torch arcing to a melt where the melt is conductive. A fourth method of heating is resistance heating by means of either resistive elements or the resistance of the process materials. Other methods of heating such as chemical reactions, fluidized bed and induction heating may be appropriate.

The method of heating contemplated by the present invention, as set forth in FIG. 5, requires that the torch 88 be positioned at one end of a cylindrical tubular portion 92 of the vessel 90. The torch 88 may be of the type illustrated in FIG. 2 or FIG. 4. The torch 88 produces an arc 94, the foot 96 of which is attached to the tubular portion 92 of the vessel 90.

The walls of the vessel 90 are constructed of an electrically conductive material such as graphite or water cooled metal. The vessel 90 is surrounded by a refractory material 98. A field coil 100 is positioned outside the refractory material 98 to circumscribe the vessel 90 in the area of the tubular portion 92. The field coil 100 causes the arc 94 to rotate very rapidly about the tubular portion 92 of the vessel 90. The vessel 90 also has output ports 102 for removing material from the vessel.

The end of the vessel 90 at which the torch 88 is positioned also carries a cap member 104 having feedstock passages 106 formed therein. Process materials, preferably particulates, may be admitted between the torch 88 and the vessel wall which process materials are heated very rapidly to a high temperature by either direct contact with the arc or by radiation from the hot walls of the vessel, or by conduction from hot gases, or a combination thereof. It is also possible to admit materials through passages 106 in such a manner to cause the materials to attach to the wall and build a liquid layer or skull. In such a case, wall erosion rates are expected to be extremely low.

The arrangement of torch 88 and vessel 90 provides a relatively small, high temperature zone where process materials may be heated very rapidly. The size (diameter and length) of the tubular portion 92 are dictated by power requirements, feed rate and process material size with smaller particles requiring less residence time. The remainder of the vessel 90 is sized to suit residence time requirements and hold capacity requirements. Gas flow rates, other than those being generated by the process, may be very low, thus minimizing effluent heat loss. For high production rates, it is possible to have several tubular portions 92 connected to one large holding vessel or furnace for which continuous processing and product taping arrangements can be made. The plasma reactor of the present invention may be easily adapted to a wide variety of processes including high temperature treatment of hazardous liquid waste materials, solid wastes, etc.

The present invention also contemplates a method of operating a plasma reactor which is comprised of the steps of providing a vessel having a tubular portion constructed of an electrically conductive material. An arc, having a head and a foot, is generated with the foot of the arc being transferred to the tubular portion of the vessel. The attachment point of the foot of the arc to the tubular portion of the vessel is rotated about the tubular portion of the vessel through the use of a field, or stirring, coil. A feedstock material may be introduced into the tubular portion of the vessel. Depending upon the positioning of the passages 106, the feedstock may be directed toward the walls of the vessel, the center line of the vessel, or any intermediate location. This arrangement provides a compact, high temperature zone where process materials may be heated very rapidly.

In summary, the present invention is directed to a transfer type of arc torch. Because of the unique arrangement and configuration of the electrodes, the arc produced is stable and easily transferred. The torch is designed to minimize electrode erosion. However, when it is necessary to replace the electrodes, the electrodes may be easily replaced from the end of the torch without complete disassembly thereof. The electrodes are configured to be easily and inexpensively manufactured. A transfer type of torch may be used in conjunction with a reactor vessel wherein the arc is to be transferred to the vessel wall.

While the present invention has been described in connection with exemplary embodiments thereof, it will be understood that many modifications and variations will be readily apparent to those of ordinary skill in the art. This disclosure in the following claims are intended to cover all such modifications and variations.

What we claim is:

1. A transferred arc torch and plasma reactor apparatus comprising:
   first and second cylindrical and tubular electrodes with a gap between adjacent ends thereof for striking an arc, said electrodes being located substantially coaxially;
   means for energizing said electrodes and initiating an arc across said gap;
   means for introducing an arc transfer gas blowing the arc from said second electrode to a surface of a tubular portion, of electrically conductive material, of a plasma reactor vessel substantially coaxially arranged with said electrodes;
   first coil means surrounding said first electrode for rotating the arc about the surface of said first electrode; and
   second coil means surrounding said tubular portion for rotating the arc therearound.

2. The apparatus of claim 1 wherein said second cylindrical electrode is substantially shorter than said first cylindrical electrode.

3. The apparatus of claim 1 additionally comprising means for de-energizing said second electrode means after the arc is transferred therefrom.

4. The apparatus of claim 1 wherein said first electrode means is operated as an anode.

5. The apparatus of claim 1 wherein said first electrode means is operated as a cathode.

6. The apparatus of claim 1 additionally comprising means for cooling said first and second electrode means.

7. The apparatus of claim 1 additionally comprising means positioned adjacent to said second electrode means for introducing a feedstock.

8. The transferred arc torch of claim 1 additionally comprising a shell surrounding said first and second electrode means and a threaded ring removably carried on the end of said shell from which the arc is transferred for retaining said electrode means within said shell.

9. The apparatus of claim 1 wherein said electrically conductive material includes graphite.

10. The apparatus of claim 1 wherein said electrically conductive material includes metal.

11. The apparatus of claim 1 wherein said tubular portion of said vessel has a first end at which said torch means is positioned, said plasma reactor additionally comprising means positioned at said first end for charging said vessel with a feedstock.

12. The plasma reactor of claim 1 additionally comprising a refractory material surrounding and insulating said vessel.

* * * * *